(12) United States Patent
Dingman et al.

(10) Patent No.: US 11,953,266 B2
(45) Date of Patent: Apr. 9, 2024

(54) OVEN WITH RENEWABLE ENERGY CAPACITIES

(71) Applicant: TPS IP, LLC, Cleveland, OH (US)

(72) Inventors: Lyle Oscar Dingman, East Troy, WI (US); Michael Abraham Schneck, New Berlin, PA (US); Gary Allen Hanson, Janesville, WI (US); David Allen Strand, Burlington, WI (US); Michael Laddie Grande, Elkhorn, WI (US); Geoffry Allen Gromiuk, Mukwonago, WI (US); Steven Edward Kempowski, Oconomowoc, WI (US); Jon Allen Ludlum, Darien, WI (US)

(73) Assignee: TPS IP, LLC, Cleveland, OH (US)

( * ) Notice: Subject to any disclaimer, the term of this patent is extended or adjusted under 35 U.S.C. 154(b) by 0 days.

(21) Appl. No.: 17/931,328

(22) Filed: Sep. 12, 2022

(65) Prior Publication Data

US 2023/0003453 A1 Jan. 5, 2023

Related U.S. Application Data

(62) Division of application No. 15/922,605, filed on Mar. 15, 2018, now Pat. No. 11,493,275.

(Continued)

(51) Int. Cl.
*F27D 17/00* (2006.01)
*A21B 3/00* (2006.01)
(Continued)

(52) U.S. Cl.
CPC ............. *F27D 17/004* (2013.01); *A21B 3/00* (2013.01); *F02C 1/04* (2013.01); *F24C 15/00* (2013.01);
(Continued)

(58) Field of Classification Search
CPC ..... A21B 1/02; A21B 3/00; F02C 1/04; F02G 5/02; F05D 2220/62; F24C 15/00;
(Continued)

(56) References Cited

U.S. PATENT DOCUMENTS 2,192,519 A  3/1940 King
2,836,498 A  5/1958 Fennema
(Continued)

FOREIGN PATENT DOCUMENTS

CN  202348357 U  7/2012
CN  202810961 U  3/2013
(Continued)

OTHER PUBLICATIONS

WO 2013171181 A1—Translation (Year: 2013).*
(Continued)

*Primary Examiner* — Steven B Mcallister
*Assistant Examiner* — Benjamin W Johnson
(74) *Attorney, Agent, or Firm* — Amin, Turocy & Watson, LLP

(57) ABSTRACT

Techniques for utilizing excess heat generated by an oven to generate electricity are provided. In one example, an oven can comprise a coolant pathway positioned adjacent to a hollow space within the oven, wherein the hollow space can contain heat. The oven can also comprise a chamber in fluid communication with the coolant pathway. The oven can further comprise a turbine in fluid communication with the chamber and an outlet. Moreover, the oven can comprise a generator connected to the turbine, wherein rotation of the turbine can power the generator.

20 Claims, 10 Drawing Sheets

Related U.S. Application Data

(60) Provisional application No. 62/570,473, filed on Oct. 10, 2017.

(51) Int. Cl.
    *F02C 1/04* (2006.01)
    *F24C 15/00* (2006.01)
    *A21B 1/02* (2006.01)
    *F02G 5/02* (2006.01)

(52) U.S. Cl.
    CPC ............... *A21B 1/02* (2013.01); *F02G 5/02* (2013.01); *F05D 2220/62* (2013.01); *F27D 17/001* (2013.01); *F27D 2017/007* (2013.01); *Y02A 40/924* (2018.01); *Y02P 60/80* (2015.11)

(58) Field of Classification Search
    CPC ............... F27D 17/001; F27D 17/004; F27D 2017/007; Y02A 40/924; Y02P 60/80
    USPC ........................................................ 122/7 R
    See application file for complete search history.

(56) References Cited

U.S. PATENT DOCUMENTS

| | | |
|---|---|---|
| 3,127,889 A | 4/1964 | Mills |
| 4,262,026 A * | 4/1981 | Korkmaz ............... A47J 37/00 426/243 |
| 4,274,688 A | 6/1981 | Zacky |
| RE31,529 E | 3/1984 | Lowe |
| 4,509,553 A | 4/1985 | Hahn |
| 4,512,362 A | 4/1985 | Groeschner |
| 4,701,334 A * | 10/1987 | Durth ............... A21B 3/04 426/523 |
| 4,708,069 A | 11/1987 | Kidd |
| 4,712,578 A | 12/1987 | White |
| 4,726,352 A | 2/1988 | Radke |
| 4,726,399 A | 2/1988 | Miller |
| 4,830,054 A | 5/1989 | Feichtiger et al. |
| 4,913,189 A | 4/1990 | Kline et al. |
| 5,107,897 A | 4/1992 | Stoll |
| 5,121,513 A | 6/1992 | Thomas et al. |
| 5,235,903 A | 8/1993 | Tippmann |
| 5,355,868 A | 10/1994 | Haen |
| 5,417,246 A | 5/1995 | Perkins et al. |
| 5,657,786 A | 8/1997 | DuRoss et al. |
| 5,927,337 A | 7/1999 | LaMantia |
| 5,993,878 A | 11/1999 | Tippmann |
| 6,247,773 B1 | 6/2001 | Harigai et al. |
| 6,578,600 B1 | 6/2003 | Young, Jr. |
| 6,713,741 B2 | 3/2004 | Miller |
| 6,766,830 B2 | 7/2004 | Rondreux et al. |
| 7,191,800 B2 | 3/2007 | Berner et al. |
| 7,484,527 B2 | 2/2009 | Tamaki et al. |
| 8,047,198 B2 | 11/2011 | Meyer et al. |
| 8,082,943 B2 | 12/2011 | Berner et al. |
| 8,172,546 B2 | 5/2012 | Cedrone et al. |
| 8,753,097 B2 | 6/2014 | Cedrone et al. |
| 8,807,164 B2 | 8/2014 | Baier et al. |
| 9,732,876 B2 | 8/2017 | Johnson |
| 10,008,037 B1 | 6/2018 | Worley, III et al. |
| 9,921,641 B1 | 8/2018 | Worley et al. |
| 10,495,374 B1 | 12/2019 | Hall et al. |
| 10,504,384 B1 | 12/2019 | Drake |
| 2002/0088244 A1 | 7/2002 | Jennings et al. |
| 2002/0088800 A1 | 7/2002 | Miller |
| 2003/0061773 A1 | 4/2003 | O'Leary |
| 2006/0289530 A1 | 12/2006 | Cordae |
| 2007/0095413 A1 | 5/2007 | Zhu et al. |
| 2007/0267402 A1 | 11/2007 | Harned et al. |
| 2008/0149088 A1 | 6/2008 | Inada et al. |
| 2008/0206420 A1 | 8/2008 | McFadden |
| 2009/0090347 A1 | 4/2009 | Kim et al. |
| 2009/0194090 A1 | 8/2009 | Kim et al. |
| 2009/0236333 A1 | 9/2009 | Ben-Shmuel et al. |
| 2010/0128755 A1 | 5/2010 | Luckhardt et al. |
| 2010/0242370 A1 | 9/2010 | Trulaske, Sr. |
| 2010/0296996 A1 | 11/2010 | Ohta et al. |
| 2011/0036826 A1 | 2/2011 | Feng et al. |
| 2011/0050872 A1 | 3/2011 | Harbert et al. |
| 2011/0151076 A1 | 6/2011 | Zapp Glauser |
| 2011/0266271 A1 * | 11/2011 | Boyer ............... F24C 15/00 219/393 |
| 2011/0283714 A1 | 11/2011 | Veltrop |
| 2011/0318698 A1 | 12/2011 | Gaur et al. |
| 2013/0092032 A1 | 4/2013 | Cafferty et al. |
| 2014/0026762 A1 | 1/2014 | Riefenstein |
| 2014/0097172 A1 | 4/2014 | Kang et al. |
| 2014/0203012 A1 | 7/2014 | Corona et al. |
| 2015/0019017 A1 | 1/2015 | Bodine et al. |
| 2015/0118632 A1 | 4/2015 | Liu |
| 2015/0182074 A1 | 7/2015 | Bucher et al. |
| 2016/0140728 A1 | 5/2016 | Aonuma et al. |
| 2016/0160880 A1 | 6/2016 | Douglas et al. |
| 2016/0187001 A1 | 6/2016 | Bombardieri et al. |
| 2016/0327281 A1 | 11/2016 | Bhogal et al. |
| 2016/0345167 A1 | 11/2016 | Li et al. |
| 2016/0356388 A1 | 12/2016 | Inoue |
| 2016/0374501 A1 | 12/2016 | Logan et al. |
| 2017/0205108 A1 * | 7/2017 | Petrovic ............... F24F 12/00 |
| 2017/0208652 A1 | 7/2017 | Luckhardt et al. |
| 2017/0243515 A1 | 8/2017 | Vengroff et al. |
| 2018/0032125 A1 | 2/2018 | Peterson et al. |
| 2018/0062691 A1 | 3/2018 | Barnett, Jr. |
| 2018/0073255 A1 | 3/2018 | Jeffries |
| 2018/0101608 A1 | 4/2018 | Thysell |
| 2018/0114372 A1 | 4/2018 | Nagy et al. |
| 2018/0163971 A1 | 6/2018 | Mizusaki et al. |
| 2018/0181094 A1 | 6/2018 | Funk et al. |
| 2018/0220500 A1 | 8/2018 | Staton et al. |
| 2018/0345485 A1 | 12/2018 | Sinnet et al. |
| 2019/0062084 A1 | 2/2019 | Delieutraz et al. |
| 2019/0066239 A1 | 2/2019 | Touchette et al. |
| 2019/0121522 A1 | 4/2019 | Davis et al. |
| 2019/0159300 A1 | 5/2019 | Khizar et al. |
| 2019/0295330 A1 | 9/2019 | Nagy et al. |
| 2019/0374059 A1 | 12/2019 | Samonigg et al. |
| 2020/0005669 A1 | 1/2020 | Thysell |

FOREIGN PATENT DOCUMENTS

| | | | |
|---|---|---|---|
| CN | 103148472 A * | 6/2013 | |
| CN | 103148472 A | 6/2013 | |
| DE | 10 2006 029 902 A1 | 1/2008 | |
| GB | 996233 A | 6/1965 | |
| WO | 2013/171181 A1 | 11/2013 | |
| WO | WO-2013171181 A1 * | 11/2013 | ........... A47J 37/0704 |
| WO | 2021/095395 A1 | 5/2021 | |

OTHER PUBLICATIONS

CN 103148472 A—Translation (Year: 2013).*
Notice of Allowance received for U.S. Appl. No. 15/922,445 dated Oct. 18, 2022, 48 pages.
Non-Final Office Action received for U.S. Appl. No. 15/922,623 dated Jul. 25, 2019, 31 pages.
Final Office Action received for U.S. Appl. No. 15/922,623 dated Dec. 16, 2019, 24 pages.
Non-Final Office Action received for U.S. Appl. No. 15/922,584 dated Mar. 2, 2020, 43 pages.
Non-Final Office Action received for U.S. Appl. No. 15/922,605 dated Apr. 3, 2020, 53 pages.
Non-Final Office Action received for U.S. Appl. No. 15/922,445 dated May 29, 2020, 45 pages.
Non-Final Office Action received for U.S. Appl. No. 15/922,569 dated Jun. 8, 2020, 36 pages.
Final Office Action received for U.S. Appl. No. 15/922,519 dated Jun. 8, 2020, 37 pages.
Notice of Allowance received for U.S. Appl. No. 15/922,584 dated Jun. 10, 2020, 50 pages.
Final Office Action received for U.S. Appl. No. 15/922,445 dated Dec. 11, 2020, 45 pages.

(56) References Cited

OTHER PUBLICATIONS

Final Office Action received for U.S. Appl. No. 15/922,605 dated Oct. 26, 2020, 24 pages.
Final Office Action received for U.S. Appl. No. 15/922,519 dated Nov. 30, 2020, 33 pages.
Final Office Action received for U.S. Appl. No. 15/922,569 dated Oct. 6, 2020, 34 pages.
Advisory Office Action received for U.S. Appl. No. 15/922,605 dated Jan. 25, 2021, 16 pages.
Non-Final Office Action received for U.S. Appl. No. 15/922,605 dated Feb. 19, 2021, 31 pages.
Advisory Office Action received for U.S. Appl. No. 15/922,519 dated Feb. 19, 2021, 12 pages.
Non-Final Office Action received for U.S. Appl. No. 15/922,445 dated Aug. 19, 2021, 49 pages.
Final Office Action received for U.S. Appl. No. 15/922,605 dated Aug. 18, 2021, 35 pages.
Non-Final Office Action received for U.S. Appl. No. 15/922,519 dated Aug. 6, 2021, 49 pages.
Non-Final Office Action received for U.S. Appl. No. 15/922,569 dated Jul. 23, 2021, 54 pages.
Non-Final Office Action received for U.S. Appl. No. 15/922,605 dated Jan. 13, 2022, 42 pages.
Notice of Allowance received for U.S. Appl. No. 15/922,519 dated Jan. 10, 2022, 57 pages.
Notice of Allowance received for U.S. Appl. No. 15/922,569 dated Dec. 1, 2021, 51 pages.
Advisory Office Action received for U.S. Appl. No. 15/922,605 dated Dec. 20, 2021, 22 pages.
Final Office Action received for U.S. Appl. No. 15/922,445 dated Mar. 15, 2022, 51 pages.
Advisory Action received for U.S. Appl. No. 15/922,445 dated Jun. 10, 2022, 29 pages.
Non-Final Office Action received for U.S. Appl. No. 15/922,445 dated Jun. 23, 2022, 37 pages.
Notice of Allowance received for U.S. Appl. No. 15/922,605 dated Oct. 13, 2022, 6 pages.
Non-Final Office Action received for U.S. Appl. No. 17/931,346 dated Mar. 2, 2023, 72 pages.
Final Office Action received for U.S. Appl. No. 17/931,346 dated Sep. 21, 2023, 89 pages.
Notice of Allowance received for U.S. Appl. No. 17/931,346 dated Dec. 6, 2023, 54 pages.
Non-Final Office Action received for U.S. Appl. No. 17/658,543 dated Feb. 1, 2024, 107 pages.

\* cited by examiner

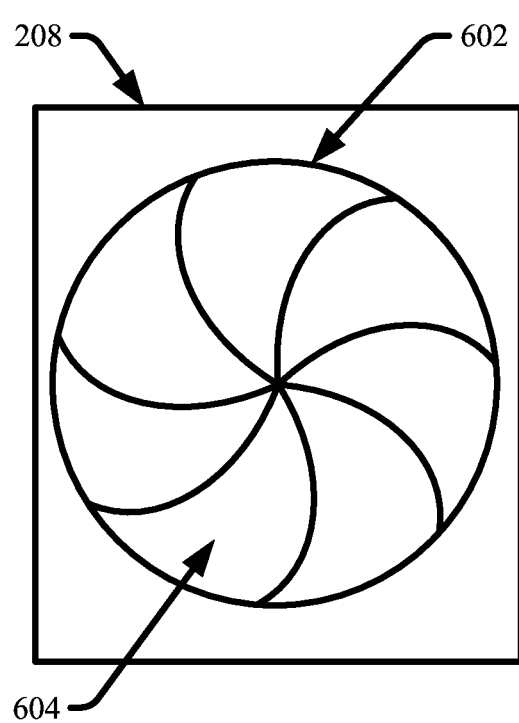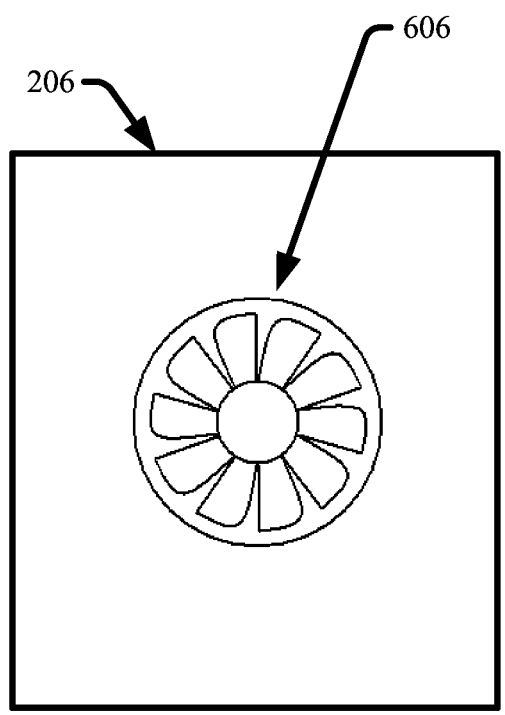
FIG. 6A  FIG. 6B

OVEN WITH RENEWABLE ENERGY CAPACITIES

CROSS-REFERENCE TO RELATED APPLICATIONS

This application is a divisional and claims priority to U.S. Non-Provisional patent application Ser. No. 15/922,605 filed Mar. 15, 2018, entitled "OVEN WITH RENEWABLE ENERGY CAPACITIES," which claims priority to U.S. Provisional Patent Application Ser. No. 62/570,473 filed on Oct. 10, 2017, entitled "OVEN WITH RENEWABLE ENERGY CAPACITIES." The entireties of the aforementioned applications are incorporated by reference herein.

TECHNICAL FIELD

The subject disclosure relates to an oven with renewable energy capacities, and more specifically, to oven apparatuses, systems, and/or methods that can facilitate the conversion of excess heat to renewable energy.

BACKGROUND ART

Ovens are capable of generating a large amount of heat in order to bake a subject item. However, the baked item does not absorb all of the generated heat. Further, many ovens are used to bake various types of items, which require varying baking conditions, and as such need to cool between bakes. Through conventional techniques, excess heat (i.e. heat not absorbed by the baked item) is wasted during the cool down process. For example, energy is generated to heat a product, and once the product is finished baking said energy dissipates without being applied to further uses. Additionally, conventional ovens fail to utilize renewable energy sources available via their environment.

Various embodiments described herein can comprise systems, apparatuses, and/or methods that can utilize renewable energy sources to power one or more ovens and/or facilitate converting excess heat generated by an oven into electricity. Also, one or more embodiments described herein can comprise computer-implemented methods, systems, and/or computer program products to facilitate managing the conversion process and/or the use of renewable energy.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, computer-implemented methods, apparatuses and/or computer program products that can convert excess heat generated by an oven into electricity are described.

According to an embodiment, an oven is provided. The oven can comprise a coolant pathway positioned adjacent to a hollow space within the oven, wherein the hollow space can contain heat. The oven can also comprise a chamber in fluid communication with the coolant pathway. The oven can further comprise a turbine in fluid communication with the chamber and an outlet. Moreover, the oven can comprise a generator connected to the turbine, wherein rotation of the turbine can power the generator.

According to another embodiments, a system is provided. The system can comprise a memory that stores computer executable components. The system can also comprise a processor, operably coupled to the memory, and that executes the computer executable components stored in the memory. The computer executable components can comprise a cooling component that can determine whether an oven requires cooling, and, in response to determining that the oven does require cooling, can distribute coolant from a coolant reservoir to a coolant pathway, wherein a phase change of the coolant can power a generator that generates electricity, which is can be stored in a battery. The computer executable components can further comprise a power monitoring component that can determine whether a power supply for the oven is interrupted, and, in response to determining that the power supply for the oven is interrupted, can supply the electricity from the battery to the oven.

According to another embodiment, a method is provided. The method can comprise determining, by a system coupled to a processor, that an oven has generated excess heat during a bake. The method can also comprise distributing a coolant from a coolant reservoir to a coolant pathway, the coolant pathway located within the oven and adjacent to the generated excess heat. Further, the method can comprise evaporating the coolant using the excess heat to generate a gas. Moreover, the method can comprise powering a generator by a flow of the gas to generate electricity, and storing the generated electricity in a battery.

BRIEF DESCRIPTION OF THE DRAWINGS

FIG. 6A illustrates a diagram of an example, non-limiting top layer of an oven that can utilize renewable energy and facilitate conversion of excess heat into electricity in accordance with one or more embodiments described herein.

FIG. 6B illustrates a diagram of another example, non-limiting top layer of an oven that can utilize renewable energy and facilitate conversion of excess heat into electricity in accordance with one or more embodiments described herein.

DETAILED DESCRIPTION

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Figure 1:
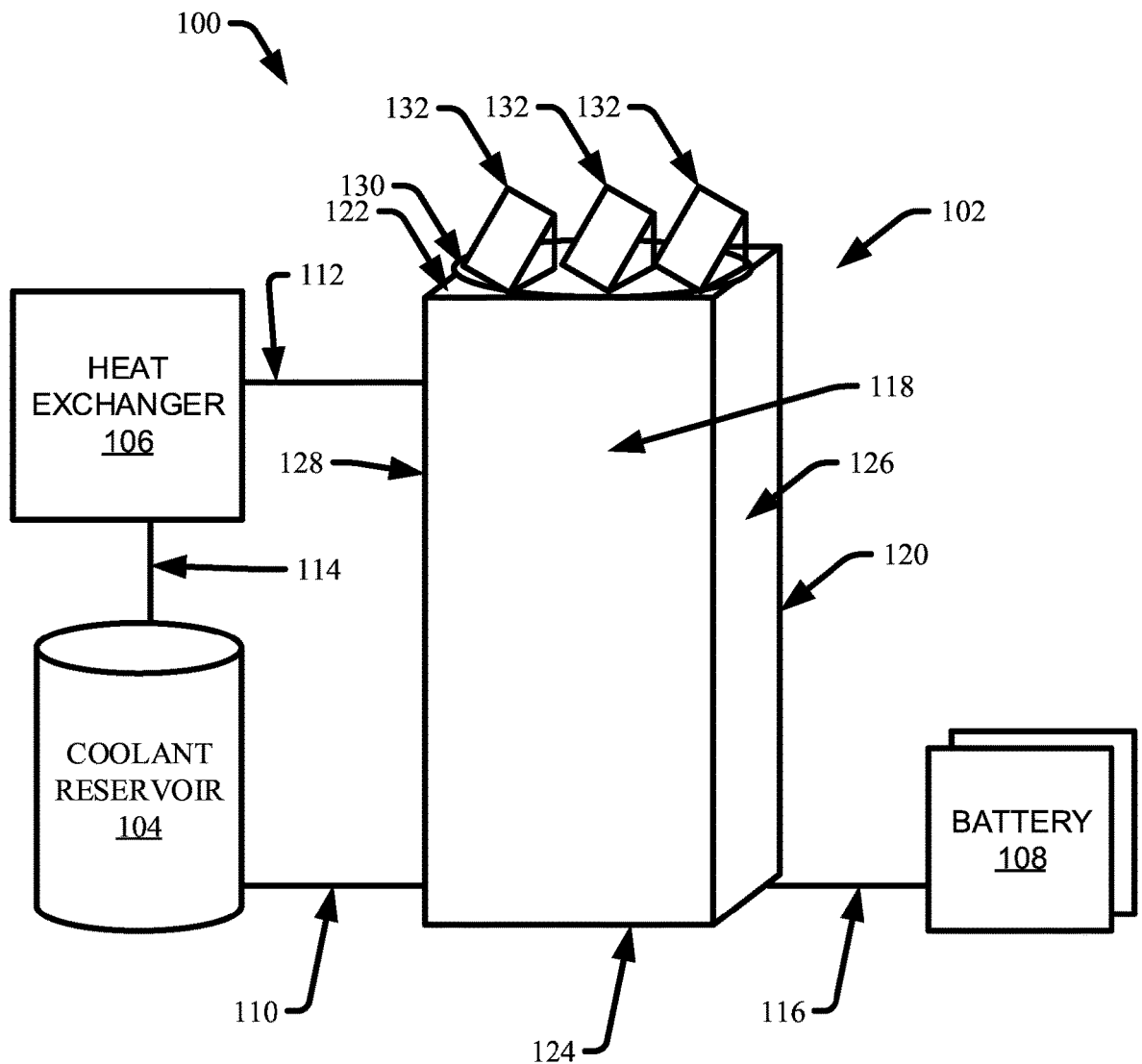
FIG. 1 illustrates a diagram of an example, non-limiting oven system that can utilize renewable energy and facilitate conversion of excess heat into electricity in accordance with one or more embodiments described herein.

FIG. 1 illustrates a diagram of an example, non-limiting oven system 100 that can utilize renewable energy and facilitate conversion of excess heat into electricity in accordance with one or more embodiments described herein. The oven system 100 can comprise one or more ovens 102, one or more coolant reservoirs 104, one or more heat exchangers 106, and/or one or more batteries 108. One or more coolant distributors 110 (e.g., pipes and/or channels) can connect the one or more coolant reservoirs 104 to the one or more ovens 102. One or more outlet pipes 112 can connect the one or more ovens 102 to the one or more heat exchangers 106. One or more transfer pipes 114 can connect the one or more heat exchangers 106 to the one or more coolant reservoirs 104. One or more electrical cords 116 can connect the one or more ovens 102 to the one or more batteries 108.

The oven 102 can comprise a front side 118, a back side 120, a top side 122, a bottom side 124, a first side 126, and a second side 128. The oven 102 can also comprise a positioning platform 130 located on the top side 122, and one or more solar panels 132 located on the positioning platform 130. The front side 118, back side 120, top side 122, bottom side 124, first side 126, and second side 128 can define the oven body. The dimensions of the oven body can vary depending on the purpose of the oven. Example oven body heights can range from, but are not limited to, greater than or equal to 2 feet to less than or equal to 100 feet. Example oven body widths can range from, but are not limited to, greater than or equal to 2 feet to less than or equal to 50 feet. Example oven body depths can range from, but are not limited to, greater than or equal to 1 foot to less than or equal to 150 feet. The dimensions of the oven body can be dictated by the purpose of the oven and/or the items to be baked within the oven. In various embodiments, the structure of the oven 102 can be, but is not limited to: a rectangular shape, a square shape, a circular shape, and/or a polygonal shape.

Each of the front side 118, back side 120, top side 122, bottom side 124, first side 126, and second side 128 can be manufactured from the same materials, from different materials, and/or a combination thereof. Example manufacturing materials for the oven body include, but are not limited to: steel, iron, iron alloys, ceramic, ceramic composites, concrete, aluminum, aluminum alloys, rubber, plastic, a combination thereof, and/or the like. Also, one or more of the front side 118, back side 120, top side 122, bottom side 124, first side 126, and/or second side 128 can comprise one or more oven doors (not shown) to provide access into the oven body.

The one or more solar panels 132 can generate electricity from light waves and store said generated electricity in the one or more batteries 108 via the one or more electrical cords 116. The positioning platform 130 can be powered by a motor to rotate 360 degrees so as to orient the solar panels 132 towards the sun in order to increase the efficiency of the solar panels 132. In other words, the positioning platform 130 can rotate to track the position of the sun as the sun traverses the sky. Example types of solar technology comprising the solar panels 132 can include, but are not limited to: monocrystalline solar panels, polycrystalline solar panels, thin-film solar panels (e.g., cadmium telluride solar panels, amorphous silicon solar panels, copper indium gallium selenide solar panels, and/or organic photovoltaic cells), and/or concentrator photovoltaic solar panels. In various embodiments, the one or more solar panels 132 can be supported by one or more pistons that can extend and/or contract to change the tilt of the subject solar panel 132 with regard to the one or more positioning platforms 130.

While FIG. 1 illustrates three solar panels 132, additional, or fewer, solar panels 132 are also envisaged in the embodiments described herein. In various embodiments, the oven 102 can comprise any number of solar panels 132 M, wherein M is an integer greater than or equal to one. The number of solar panels 132 can be dependent on the dimensions of the top side 122. The more surface area available via the top side 122, the more solar panels 132 can be included in the oven 102. Also, while a single positioning platform 130 is illustrated in FIG. 1, additional positioning platforms 130 are also envisaged in various embodiments. For example, the oven 102 can comprise a positioning platform 130 for each respective solar panel 132.

In various embodiments, the coolant reservoir 104 can store liquid coolant (e.g., a heat transfer fluid). The coolant can be pumped to the oven 102 from the coolant reservoir 104 via the one or more coolant distributors 110. The coolant can absorb heat from the oven 102 and undergo a phase change from liquid to gas. Example types of coolant can include, but are not limited to: water, halomethanes, haloalkanes, anhydrous ammonia, carbon dioxide, nanofluids and/or the like. The coolant distributors 110 can transfer the coolant into the first side 126, second side 128, and/or back side 120 of the oven 102. Once inside the oven 102, the liquid coolant can absorb excess heat generated by the oven 102, thereby evaporating into a heated gas. The heated gas can then leave the oven 102 via the one or more outlet pipes 112 to the heat exchanger 106. As the gas leaves the oven 102, the flow of the gas can power one or more electric generators, which can store generated electricity in the one or more batteries 108 via the one or more electrical cords 116. The heat exchanger 106 can then absorb heat from the heated gas, thereby condensing the gas back to a liquid coolant, and transfer the liquid coolant to the coolant reservoir 104 via one or more transfer pipes 114.

In one or more embodiments, the one or more batteries 108 can store electricity generated by the oven 102 (e.g., electricity generated by solar power and/or electricity generated from excess heat). In one or more embodiments, the electricity stored in the one or more batteries 108 can be used at a later time to power the one or more ovens 102. In some embodiments, the one or more batteries 108 can be connected to a power grid and the stored electricity can be sold to a utility company. In various embodiments, the one or more batteries 108 can be used to power other electrical devices.

Figure 2:
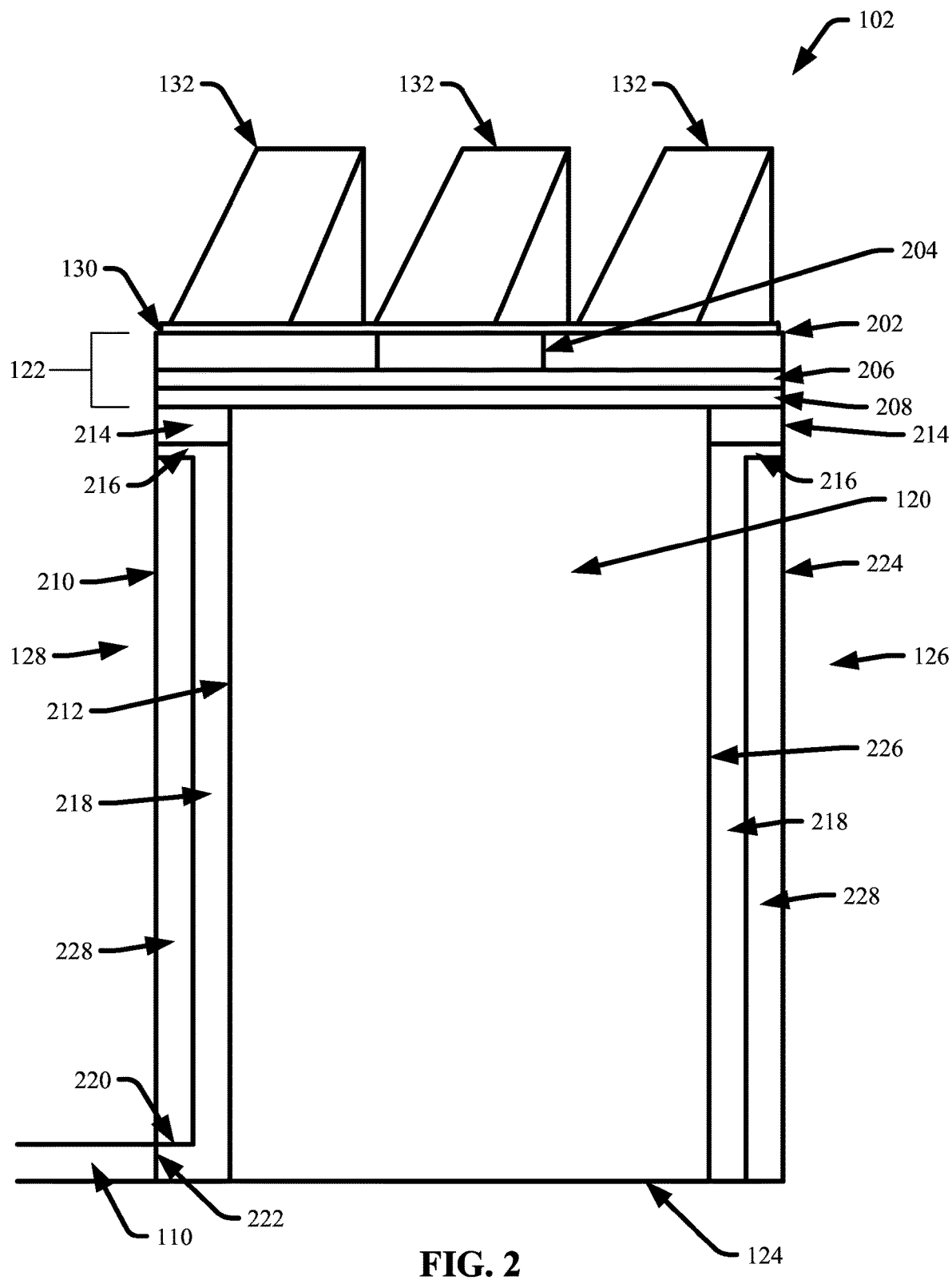
FIG. 2 illustrates a diagram of a cross-sectional view of an example, non-limiting oven that can utilize renewable energy and facilitate conversion of excess heat into electricity in accordance with one or more embodiments described herein.

FIG. 2 illustrates a cross-sectional view of the oven 102 in order to show the various features within the first side 126, the second side 128, and/or the top side 122. Repetitive description of like elements employed in other embodiments described herein is omitted for sake of brevity. The top side 122 can comprise a top surface 202, a first electric generator 204, a first top layer 206, and/or a second top layer 208. The one or more solar panels 132 and the one or more positioning platforms 130 can be located on the top surface 202 of the top side 122. The top surface 202, the first top layer 206, and/or the second top layer 208 can be manufactured from the same type of materials, different types of materials, and/or a combination thereof. Example manufacturing materials include, but are not limited to: steel, iron, iron alloys, ceramic, ceramic composites, concrete, aluminum, aluminum alloys, rubber, plastic, a combination thereof, and/or the like.

Conventional techniques are known for quenching an item by exposing the item to a coolant within an oven after baking said item. The quenching process can cause the coolant to evaporate, thereby creating a heated gas. In various embodiments, heated gas created via a quenching process can travel through the second top layer 208 and be guided by the first top layer 206 to power the first electric generator 204. The heated gas can then leave the oven 102 via one or more outlet pipes 112 connected to the first electric generator 204. As the gas leaves the oven 102, the flow of the gas can power the first electric generator 204. Example generator types and/or technology comprising the first electric generator 204 can include, but are not limited to: alternating current generators (e.g., single-phase or polyphase) and/or direct current generators (e.g., shunt, series, or compound wound). The first electric generator 204 can be connected to the one or more batteries 108 via one or more electrical cords 116, whereupon the one or more batteries 108 can store the electricity generated by the first electric generator 204. In various embodiments, the oven 102 can comprise additional first electric generators 204 (e.g., three, four, five, or more first electric generators 204) located between the top surface 202 and the first top layer 206. Additionally, although not shown, structural supports and/or operating hardware can be located between the top surface 202 and the first top layer 206.

The second side 128 can comprise a first outer surface 210 and a first inner surface 212. Located between the first outer surface 210 and the first inner surface 212, the second side 128 can comprise: a chamber 214, an outlet manifold 216, and one or more coolant pipes 218, and an inlet manifold 220. Also, the first outer surface 210 can comprise an inlet hole 222 via which the inlet manifold 220 can connect to the one or more coolant distributors 110.

In various embodiments, once a bake is complete, liquid coolant can be pumped from the one or more coolant reservoirs 104, through the one or more coolant distributors 110, and into the inlet manifold 220 via the one or more inlet holes 222. The liquid coolant can then flow from the inlet manifold 220 up the one or more coolant pipes 218. As the coolant flows up the one or more coolant pipes 218, the coolant can absorb excess heat generated by the oven 102, thereby evaporating into a heated gas. The heated gas can leave the one or more coolant pipes 218 and enter the chamber 214 via the outlet manifold 216.

In some embodiments, one or more of the inlet holes 222 can lead to a second inlet manifold that leads into the hollow space defined by the oven body. During a quenching process, coolant can be dispensed into the hollow space via the inlet holes 222 and/or the second manifold.

Similarly, the first side 126 and/or the back side 120 can have outer surfaces and inner surfaces. For example, FIG. 2 shows the first side 126 comprising a second outer surface 224 and/or a second inner surface 226. The inlet manifold 220 can extend between the outer surfaces and the inner surfaces of the back side 120 and the first side 126. Also, in one or more embodiments, the one or more coolant pipes 218 can be located between the outer surfaces and inner surfaces of the back side 120 and/or the first side 126, extending from the inlet manifold 220. For example, FIG. 2 shows one or more coolant pipes 218 located between the second outer surface 224 and the second inner surface 226 of the first side 126. In various embodiments, the outlet manifold 216 can also extend between the outer surfaces and inner surfaces of the back side 120 and the first side 126, connecting to the one or more coolant pipes 218. For example, FIG. 2 shows the outlet manifold 216 located between the second outer surface 224 and the second inner surface 226 and connected to the one or more coolant pipes 218. In one or more embodiments, the chamber 214 can further extend between the outer surfaces and inner surfaces of the back side 120 and the first side 126. For example, FIG. 2 shows the chamber 214 located between the second outer surface 224 and the second inner surface 226 of the first side 126.

While FIG. 2 illustrates only the first outer surface 210 comprising the one or more inlet holes 222, and the one or more coolant distributors 110 connecting to just the second side 128, the embodiments described herein are not so limited. For example, one or more coolant distributors 110 can be connected (e.g., via one or more inlet holes 222) to: the second side 128 (as shown in FIG. 2), the back side 120, the first side 126, and/or a combination thereof.

In one or more embodiments, a space 228 can be located between the one or more coolant pipes 218 and the outer surfaces of the first side 126, the back side 120, and/or the second side 128. The space 228 can house various mechanical and/or electrical devices and/or hardware to facilitate operation of the oven 102. Additionally, the space 228 can be filled with insulations.

Figure 3:
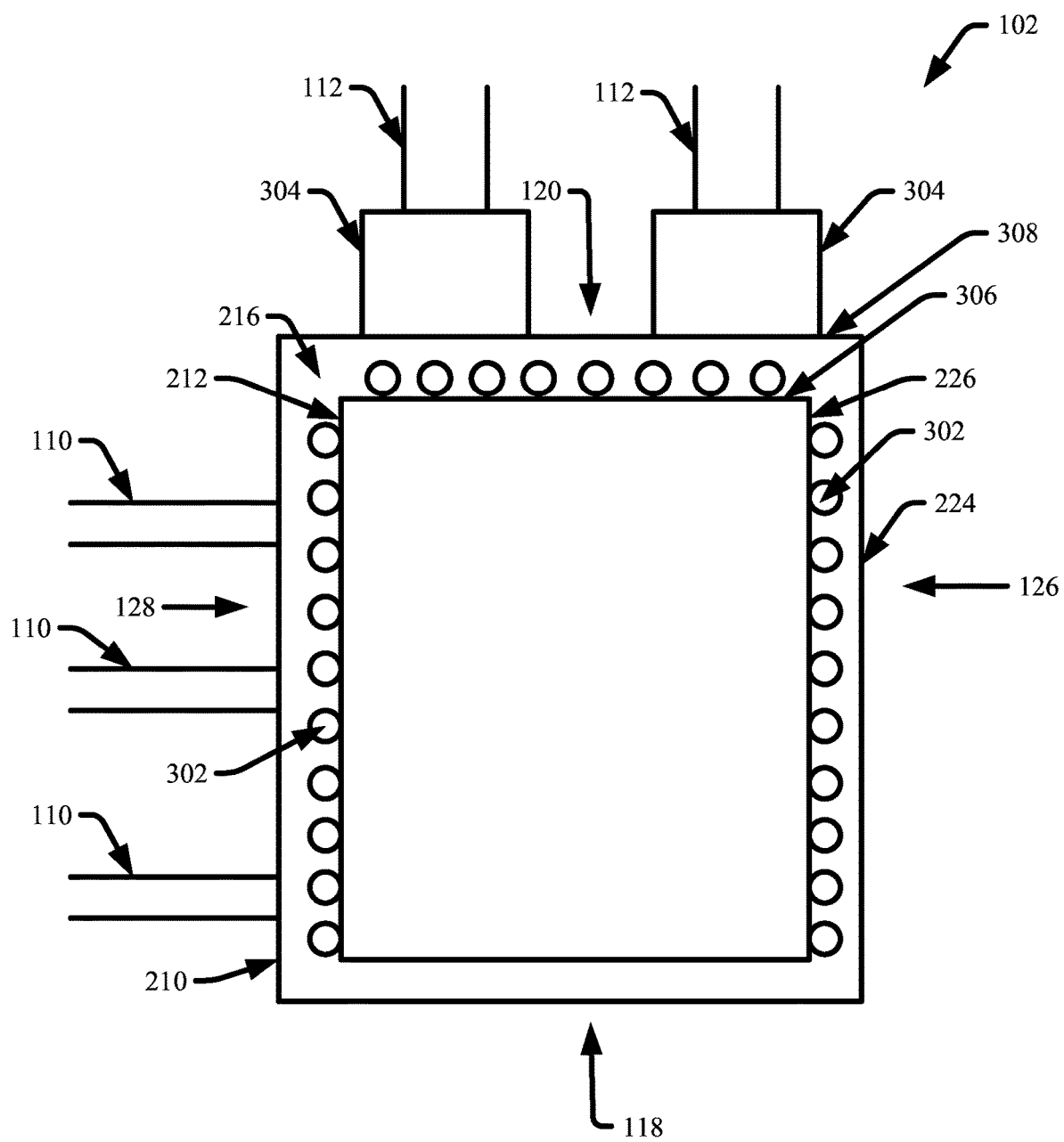
FIG. 3 illustrates a diagram of an example, non-limiting oven that can utilize renewable energy and facilitate conversion of excess heat into electricity in accordance with one or more embodiments described herein.

FIG. 3 illustrates a diagram of an example, non-limiting top view of the oven 102 absent the one or more solar panels 132, the one or more positioning platforms 130, and the top side 122 in order show various features regarding the first side 126, the back side 120, and the second side 128. Repetitive description of like elements employed in other embodiments described herein is omitted for sake of brevity. As shown in FIG. 3, the outlet manifold 216 can comprise one or more outlet holes 302 associated with each respective coolant pipe 218 so as to facilitate fluid flow from the one or more coolant pipes 218 to the chamber 214. Further, the oven 102 can comprise one or more second electric generators 304 connected to the oven body (e.g., the back side 120). As heated gas escapes the chamber 214 into the one or more outlet pipes 112, the flow of the gas can power the one or more second electric generators 304.

In various embodiments, as the coolant evaporates, pressure builds in the one or more coolant pipes 218 thereby forcing the heated gas into the chamber 214 via the one or more outlet holes 302 in the outlet manifold 216. The outlet manifold 216 can extend: from the first outer surface 210 to the first inner surface 212 of the second side 128, from the second outer surface 224 to the second inner surface 226 of the first side 126, and/or from a third outer surface 306 to a third inner surface 308 of the back side 120. Thus, in one or more embodiments the outlet manifold 216 can prevent the heated gas from entering the space 228. As more and more heated gas enters the chamber 214 from the one or more coolant pipes 218, pressure can build within the chamber 214, thereby forcing the heated gas out of the chamber 214 via the one or more second electric generators 304.

The flow of the heated gas exiting the chamber 214 can power the one or more second electric generators 304. Subsequently, the heated gas can enter one or more outlet pipes 112 connected to the one or more second electric generators 304. Example generator types and/or technology comprising the one or more second electric generators 304 can include, but are not limited to: alternating current generators (e.g., single-phase or polyphase) and/or direct current generators (e.g., shunt, series, or compound wound). The one or more second electric generator 304 can be connected to the one or more batteries 108 via one or more electrical cords 116, whereupon the one or more batteries 108 can store the electricity generated by the one or more second electric generators 304.

While FIG. 3 illustrates second electric generators 304 and one or more outlet pipes 112 connected to only the back side 120, the embodiments described herein are not so limited. For example, one or more second electric generators 304 and/or one or more outlet pipes 112 can be connected to: the second side 128, the back side 120 (as shown in FIG. 3), the first side 126, and/or a combination thereof. Also, while FIG. 3 illustrates three coolant distributors 110 and two outlet pipes 112, the embodiments described herein are not so limited. For example the oven system 100 can comprise any number of coolant distributors 110 and/or outlet pipes 112 equal to or greater than one. The number of coolant distributors 110 and/or outlet pipes 112 can be dependent on the dimensions of the oven 102 and/or properties of the cooling process (e.g. how much coolant is necessary to absorb the excess heat). For instance, the oven system 100 can comprise one, two, three, four, or more coolant distributors 110 and one, two, three, four, or more outlet pipes 112.

Figure 4:
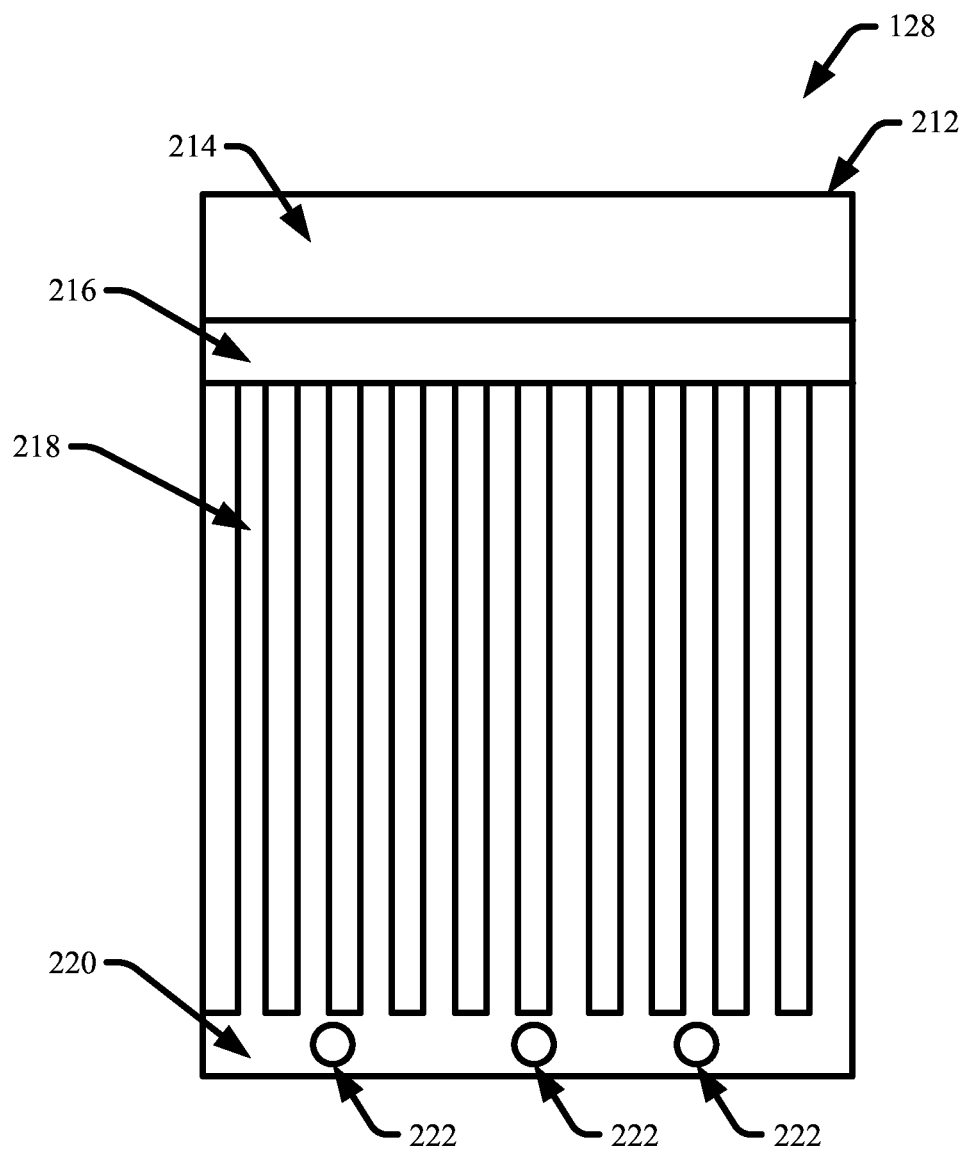
FIG. 4 illustrates a diagram of an example, non-limiting side of an oven that can utilize renewable energy and facilitate conversion of excess heat into electricity in accordance with one or more embodiments described herein.

FIG. 4 illustrates a diagram of an example, non-limiting side view of the second side 128 absent the first outer surface 210. Repetitive description of like elements employed in other embodiments described herein is omitted for sake of brevity. FIG. 4 shows an example configuration of the one or more coolant pipes 218 inside the second side 128, wherein the coolant pipes 218 are arrange vertically from left to right across the width of the second side 128. In various embodiments, the one or more coolant pipes 218 can be arranged in alternate configurations. Example configurations for the one or more coolant pipes 218 can include, but are not limited to: a vertical configuration (as shown in FIG. 4), a horizontal configuration, a diagonal configuration, a checkered configuration, a cross configuration, a circular configuration, a curvy configuration (e.g., comprising a series of 'S' shapes), a combination thereof, and/or the like.

In various embodiments, the orientation of the one or more coolant pipes 218 can be: the same is each of the first side 126, the back side 120, and/or the second side 128, different in each of the first side 126, the back side 120, and/or the second side 128, and/or a combination thereof. Additionally, while FIG. 4 shows the one or more coolant pipes 218 oriented across nearly the entire width of the second side 128, various embodiments can comprise the one or more coolant pipes 218 oriented across only a portion of the second side 128. Likewise, one or more coolant pipes 218 can be oriented across nearly the entire widths of the back side 120 and/or the first side 126 or can be oriented across only a portion of the back side 120 and/or the first side 126.

In one or more embodiments, the proximity of adjacent coolant pipes 218 can vary across the first side 126, the back side 120, and/or the second side 128. For example, coolant pipes 218 can be positioned close to each other in areas expected to have large amounts of heat and further from each other in areas expected to have smaller amounts of heat.

Figure 5A:
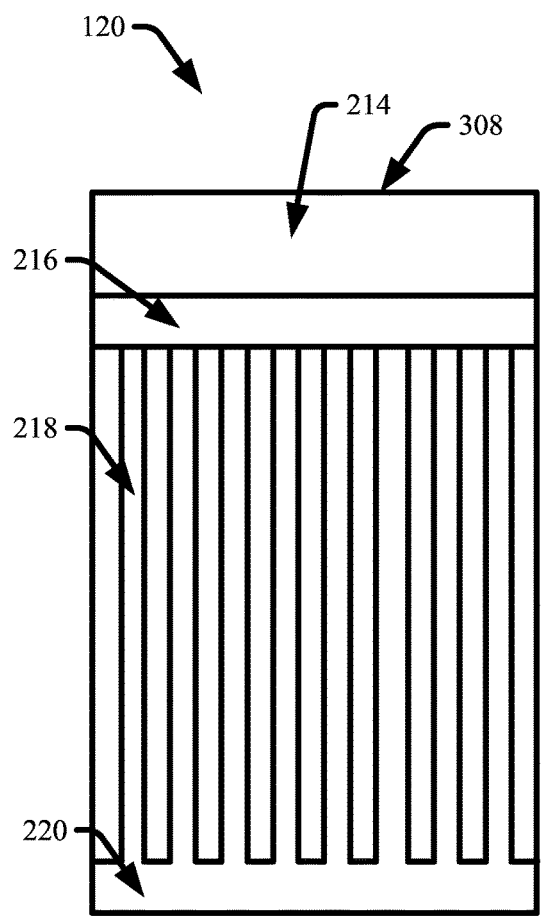
FIG. 5A illustrates a diagram of another example, non-limiting side of an oven, which can utilize renewable energy and facilitate conversion of excess heat into electricity, from a first perspective in accordance with one or more embodiments described herein.

FIG. 5A illustrates a diagram of an example, non-limiting side view of the back side 120 absent the third outer surface 306, thereby showing the third inner surface 308. Repetitive description of like elements employed in other embodiments described herein is omitted for sake of brevity. As shown in FIG. 5A the chamber 214, the outlet manifold 216, and/or the inlet manifold 220 can extend across the back side 120. Further, FIG. 5A shows one or more coolant pipes 218 arranged in a vertical configuration. In various embodiments, one or more coolant pipes 218 can be arranged across the back side 120 in accordance with the other configurations described herein.

Figure 5B:
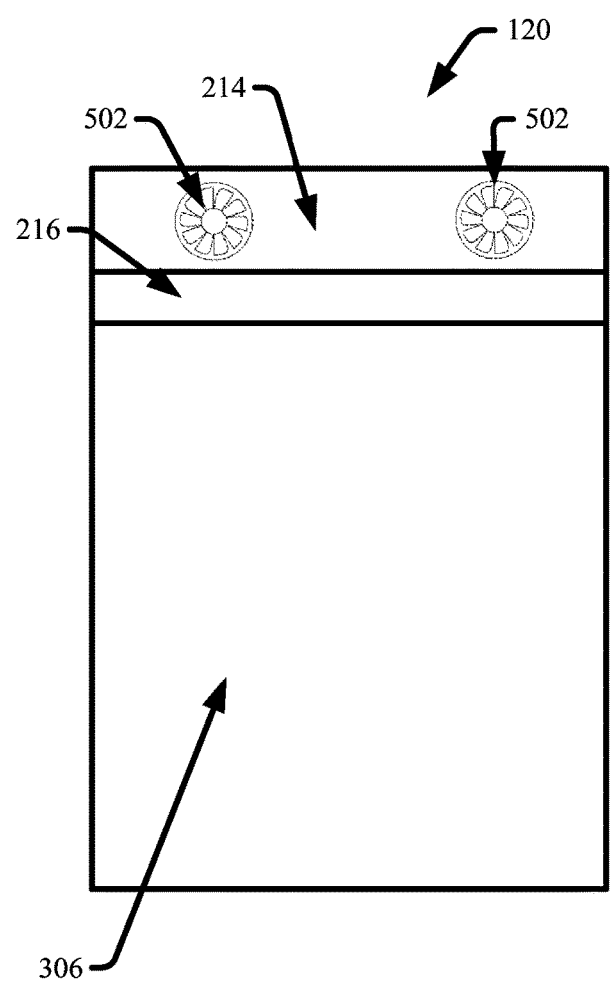
FIG. 5B illustrates a diagram of another example, non-limiting side of an oven, which can utilize renewable energy and facilitate conversion of excess heat into electricity, from a second perspective in accordance with one or more embodiments described herein.

FIG. 5B illustrates a diagram of an example, non-limiting side view of the back side 120 from an internal perspective, thereby showing the third outer surface 306 from within the back side 120. Repetitive description of like elements employed in other embodiments described herein is omitted for sake of brevity. The third outer surface 306 can comprise one or more first outlet turbines 502 (e.g., a gas turbine) in fluid communication with the chamber 214. As pressure builds in the chamber 214 from the addition of heated gas from the one or more coolant pipes 218, gas in the chamber 214 can be forced out of the chamber 214 through the one or more first outlet turbines 502. The one or more first outlet turbines 502 can be connected to the one or more second electric generators 304 such that the flow of gas escaping the chamber 214 powers the one or more first outlet turbines 502, which drive the one or more second electric generators 304.

In various embodiments, the one or more first outlet turbines 502 can be in fluid communication with the chamber 214 and located in the first outer surface 210, the second outer surface 224, the third outer surface 306, and/or a combination thereof. In one or more embodiments, each first outlet turbine 502 can be connected to an outlet pipe 112 and a second electric generator 304. While FIG. 5B shows the third outer surface 306 comprising two first outlet turbines 502, the embodiments described herein are not so limited. The back side 120 can comprise any number of first outlet turbines 502 depending on the size and cooling conditions of the oven 102 (e.g., one, two, three, four, five, or more first outlet turbines 502). Further, as described above, the third outer surface 306 can comprise one or more inlet holes 222 to connect one or more coolant distributors 110 to the portion of the inlet manifold 220 that traverses across the back side 120.

FIG. 6A illustrates a diagram of an example, non-limiting top view of the second top layer 208 of the top side 122. Repetitive description of like elements employed in other embodiments described herein is omitted for sake of brevity. The second top layer 208 can comprise a top door 602. The top door 602 can be positioned over the hollow space of the oven 102 defined by the oven body (e.g., the front side 118, the back side 120, the bottom side 124, the first side 126, and/or the second side 128). The top door 602 can have a circular structure and comprise a plurality of panels 604 that can extend from the parameter of the top door 602 to its center when in a closed state.

In various embodiments, the top door 602 can have a different shape such as, but not limited to: a square shape, a rectangular shape, an oval shape, a polygonal shape, and/or a triangular shape. The shape of the top door 602 can be influenced by the shape of the hollow space within the oven 102. Further, in one or more embodiments, the second top layer 208 can comprise a plurality of top doors 602, wherein each top door 602 of the plurality of top doors 602 can have the same shape, a different shape, or a combination thereof. In various embodiments, the top door 602 can be configured to open into the hollow space and/or slide open on the same plane as the second top layer 208. Example manufacturing materials for the top door 602 include, but are not limited to: steel, iron, iron alloys, ceramic, ceramic composites, concrete, aluminum, aluminum alloys, rubber, plastic, a combination thereof, and/or the like.

FIG. 6B illustrates a diagram of an example, non-limiting top view of the first top layer 206 of the top side 122. Repetitive description of like elements employed in other embodiments described herein is omitted for sake of brevity. The first top layer 206 can comprise a second outlet turbine 606. The second outlet turbine 606 can be aligned with the top door 602 such that when the top door 602 opens the second outlet turbine 606 can be in fluid communication with the hollow space within the oven 102. Further, the second outlet turbine 606 can be connected to the first electric generator 204 and one or more outlet pipes 112. In various embodiments, the first top layer 206 can comprise a plurality of second outlet turbines 606, wherein each second outlet turbine 606 can be connected to a respective first electric generator 204. Also, the size of the one or more second outlet turbines 606 can depend on the dimensions of the oven 102, desired cooling properties, and/or the size of the one or more top doors 602.

As described above, during a quenching process a coolant can be introduced the oven's 102 hollow space, thereby producing a heated gas within the hollow space. In various embodiments, the top door 602 can be opened so as to permit the heated gas within the hollow space to pass through the second top layer 208 and flow through the one or more second outlet turbines 606 in the first top layer 206. The flow of the heated gas can power the one or more second outlet turbines 606, which drive the one or more first electric generators 204, and pass into one or more outlet pipes 112. Example manufacturing materials comprising the first top layer 206 can include, but are not limited to: steel, iron, iron alloys, ceramic, ceramic composites, concrete, aluminum, aluminum alloys, rubber, plastic, a combination thereof, and/or the like.

Figure 7:
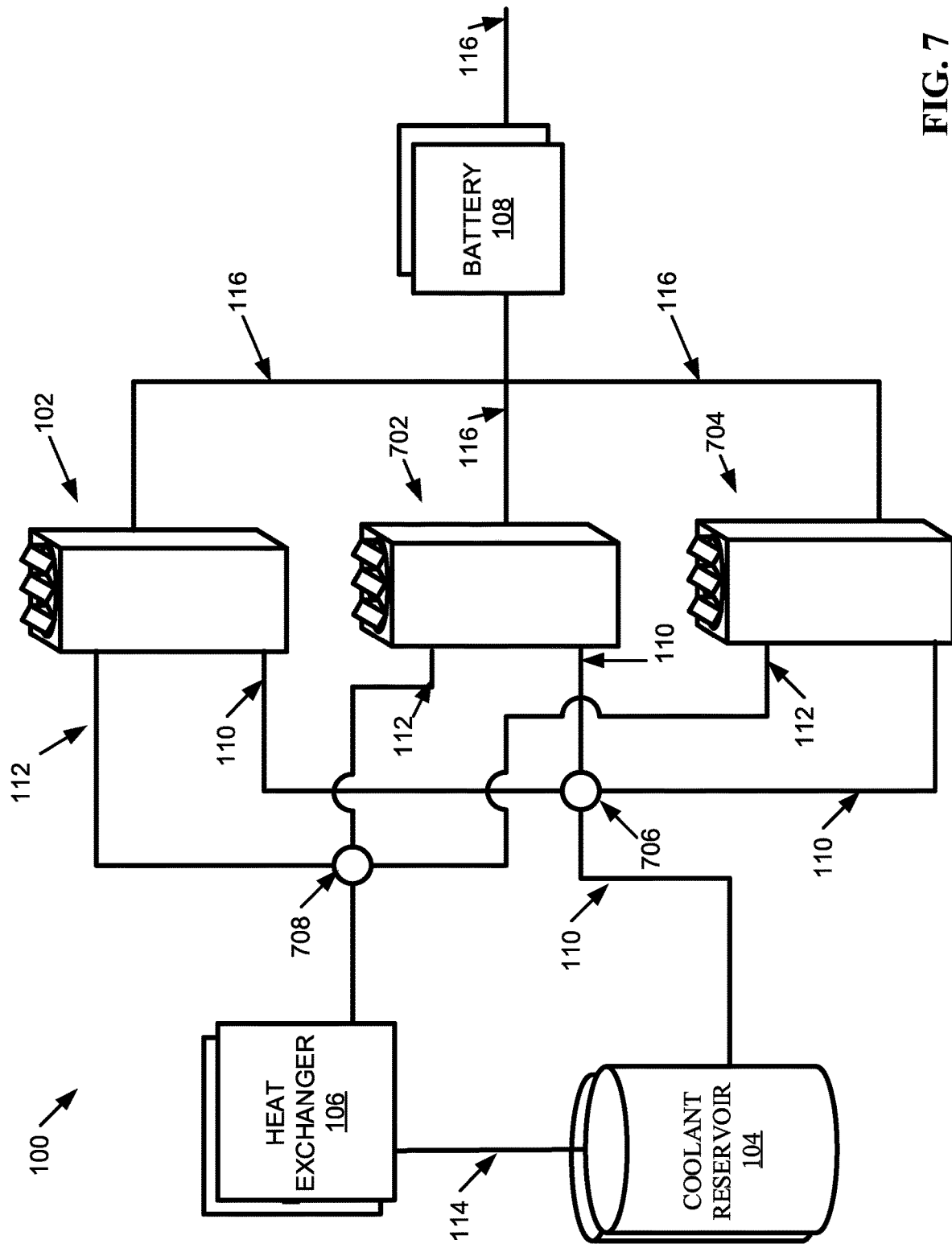
FIG. 7 illustrates a diagram of an example, non-limiting oven system comprising a plurality of ovens that can utilize renewable energy and facilitate conversion of excess heat into electricity in accordance with one or more embodiments described herein.

FIG. 7 illustrates a diagram of the example, non-limiting oven system 100 comprising a plurality of ovens 102. Repetitive description of like elements employed in other embodiments described herein is omitted for sake of brevity. FIG. 7 shows that the oven system 100 can comprise additional ovens 102 (e.g., second oven 702 and/or third oven 704). The second oven 702 and/or the third oven 704 can comprise equivalent features and/or perform equivalent functions as the oven 102 described in various embodiments herein.

The oven 102, the second oven 702, and/or the third oven 704 can be connected to one or more coolant reservoirs 104 via one or more coolant distributors 110. Coolant can be guided from the one or more coolant reservoirs 104 to one or more of the ovens (e.g., the oven 102, the second oven 702, and/or the third oven 704) via the one or more coolant distributors 110 in cooperation with a first junction 706. As coolant leaves the coolant reservoir 104 via a coolant distributor 110, the first junction 706 can either block or grant access to one or more pathways, wherein each pathway can lead to a respective oven (e.g., the oven 102, the second oven 702, and/or the third oven 704). Also, in various embodiments, each oven (e.g., the oven 102, the second oven 702, and/or the third oven 704) comprising the oven system 100 can be connected to a respective coolant reservoir 104.

The oven 102, the second oven 702, and/or the third oven 704 can be connected to one or more heat exchangers 106 via one or more outlet pipes 112. Heated gas can be guided from the one or more ovens (e.g., the oven 102, the second oven 702, and/or the third oven 704) to the one or more heat exchangers 106 via the one or more outlet pipes 112 in cooperation with a second junction 708. As gas leaves an oven (e.g., the oven 102, the second oven 702, and/or the third oven 704) via an outlet pipe 112, the second junction 708 can either block or grant access to one or more pathways, wherein each pathway can lead to a respective heat exchanger 106. Also, in various embodiments, each oven (e.g., the oven 102, the second oven 702, and/or the third oven 704) comprising the oven system 100 can be connected to a respective heat exchanger 106.

The oven 102, the second oven 702, and/or the third oven 704 can be connected to one or more batteries 108 via one or more electrical cords 116. As the ovens (e.g., the oven 102, the second oven 702, and/or the third oven 704) generate electricity (e.g., via each oven's respective generators), the electricity can be stored in the one or more batteries 108. In some embodiments, the ovens (e.g., the oven 102, the second oven 702, and/or the third oven 704) can also draw electricity from the one or more batteries 108 to power various electrical functions of the oven. In various embodiments, the one or more batteries 108 can be connected to other electrical devices and supply power to said devices. In one or more embodiments, the one or more batteries 108 can be connected to a power grid to facilitate selling electricity to a utility provider.

While FIG. 7 illustrates three ovens (e.g., the oven 102, the second oven 702, and/or the third oven 704) comprising the oven system 100, the embodiments described herein are not so limited. In various embodiments, the oven system 100 can comprise one, two, three, four, five, six, or more ovens.

Various embodiments of the present invention can be directed to computer processing systems, computer-implemented methods, apparatus and/or computer program products that facilitate the efficient, effective, and autonomous (e.g., without direct human guidance) management of the oven system 100. For example, one or more embodiments described herein can control a cooling process facilitated by the oven system 100. Some embodiments described herein can control the use of renewable energy collected and/or generated by the oven system 100 (e.g., the oven 102). Further, one or more embodiments can facilitate managing the distribution of stored power generated by the oven system 100.

Provided is a detailed description on cloud computing. The embodiments described herein can be implemented in conjunction with a cloud computer environment. However, it is to be understood that the embodiments described herein are also capable of being implemented in conjunction with any other type of computing environment.

Cloud computing can serve as a convenient and reliable technology for providing an entity with access to a shared pool of computer resources. For example, cloud computing technology can enable an entity to access various networks, servers, computerized devices, software applications, storage, and services comprising the cloud environment. Further, access to the computer resources in the cloud environment can be managed via minimal interaction between the entity and a service provider. In various embodiments, a cloud environment can comprise multiple characteristics, service models, and/or deployment models.

Example characteristics of a cloud environment can include, but are not limited to: on-demand self-service, broad network access, resource pooling, rapid elasticity, and/or measured service. On-demand self-service can enable an entity to unilaterally provision computer resources (e.g., server time and network storage) as need automatically and with or without requiring human interaction with a provider of the computer resources. Cloud computing can provide broad network access over one or more networks via standard mechanisms that are compatible with various client platforms (e.g., mobile devise, computers, and/or personal digital assistants (PDAs).

In various cloud computing embodiments, a service provider's computing resources can be pooled to facilitate serving multiple entities simultaneously and/or sequentially. Different physical and/or virtual resources can be dynamically assigned and/or reassigned to meet the entity's demands. As such, entities utilizing the cloud environment generally have no control or knowledge over the exact location of the pooled resources but may identify a location with a high level of abstraction (e.g., country, state, and/or datacenter).

Additionally, cloud computing capabilities can be rapidly and elastically provisioned. For example, said capabilities can be automatically provisioned to quickly scale out and rapidly scale in. For an entity consuming the services of the cloud environment, capabilities for provisioning can appear to appear vast and available in any desired quantity at any desired time. Cloud computing systems can also automatically control and optimize the use of computer resources by leveraging a metering capability at a level of abstraction in accordance with the type of service provided by the cloud environment (e.g., storage, processing, and/or bandwidth). Computer resources comprising the cloud environment can be monitored, controlled, and/or reported to provide transparency and/or accountability for a consuming entity and/or a provider of the cloud's services.

Example service models of cloud computing can include, but are not limited to: software as a service (SaaS), platform as a service (PaaS), and/or infrastructure as a service (IaaS). In SaaS models, a service provider can enable an entity to use one or more applications (e.g., created by the provider) operating in a cloud infrastructure. Further, an entity can access an application on the cloud environment via one or more client interfaces such as a web browser. In other words, an entity utilizing the application can readily access the application through multiple platforms without having to maintain the cloud infrastructure.

In PaaS models, an entity can deploy their own applications on a cloud environment using programming tools supplied and/or supported by the provider of the cloud infrastructure. In IaaS models, the cloud environment provisions computer resources (e.g., processing, networks, and/or storage) for an entity to utilize when operating arbitrary software such as operating systems and applications. Thus, in the PaaS and/or IaaS models, the entity does not have control over the underlying cloud structure, but can control subject applications (e.g., the operating system) and configurations (e.g., networks and firewalls).

Example deployment models of cloud computing can include, by are not limited to: private clouds, community clouds, public clouds, and/or hybrid clouds. A private cloud model can be operated for a specific entity while denying access/services to alternate parties. The cloud can be managed by the specific entity or a third party and can be located on the entity's premises or off the entity's premises. A community cloud can be operated for a plurality of organizations that share a common interest and/or concern (e.g., common mission, common security requirements, common policy, and/or common compliance considerations). Like the private cloud, the community cloud can be managed by one or more of the plurality of organizations and/or a third party.

A public cloud can be operated for the general public and/or a large group of entities (e.g., an industry). Further, public clouds can be owned by an organization that sells cloud services. A hybrid cloud can be a cloud infrastructure comprising two or more different deployment models (e.g., a private cloud and a community cloud). The various deployment models in the hybrid cloud structure can remain unique entities but be bound together by standardized or proprietary technology that can facilitate data and/or application portability (e.g., cloud bursting).

A cloud computer environment can comprise one or more nodes, wherein each node can be a computerized device (e.g., a desktop computer, a laptop computer, a mobile device, a tablet, an automobile system, and/or the like) used by a consumer of cloud services. The nodes can be connected via one or more networks in order to facilitate communication between the nodes and access to the cloud environment. Further, the nodes can be physically and/or virtually grouped in one or more networks to enable one or more deployment models. One of the advantages of cloud computing is the ability to provide services to a consumer via a multitude of platforms without requiring the consumer to sustain and/or maintain computer resources on a specific device.

Figure 8:
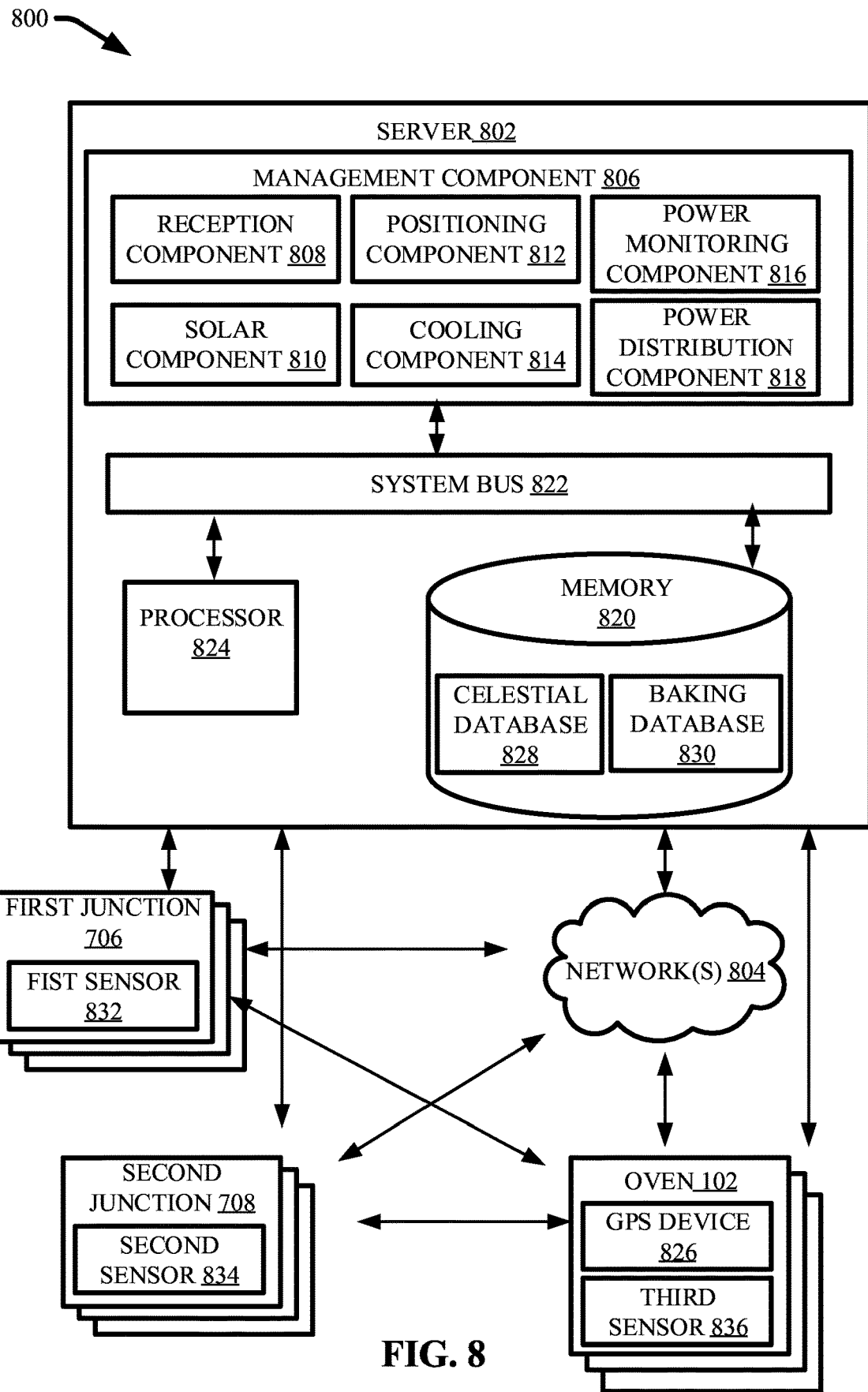
FIG. 8 illustrates a diagram of an example, non-limiting system that can facilitate management of one or more ovens that can utilize renewable energy and facilitate conversion of excess heat into electricity in accordance with one or more embodiments described herein.

FIG. 8 illustrates a block diagram of an example, non-limiting system 800 that can facilitate management of the oven system 100. Repetitive description of like elements employed in other embodiments described herein is omitted for sake of brevity. Aspects of systems (e.g., system 800 and the like), apparatuses or processes in various embodiments of the present invention can constitute one or more machine-executable components embodied within one or more machines, e.g., embodied in one or more computer readable mediums (or media) associated with one or more machines. Such components, when executed by the one or more machines, e.g., computers, computing devices, virtual machines, etc. can cause the machines to perform the operations described.

As shown in FIG. 8, the system 800 can comprise one or more servers 802, one or more networks 804, the one or more ovens 102, the first junction 706, and/or the second junction 708. The server 802 can comprise management component 806. The management component 806 can further comprise reception component 808, solar component 810, positioning component 812, cooling component 814, power monitoring component 816, and/or power distribution component 818. Also, the server 802 can comprise or otherwise be associated with at least one memory 820. The server 802 can further comprise a system bus 822 that can couple to various components, such as, but not limited to, the management component 806 and associated components, memory 820, and/or processor 824. While a server 802 is illustrated in FIG. 8, in other embodiments, multiple devices of various types can be associated with or comprise the features shown in FIG. 8.

The one or more networks 804 can comprise wired and wireless networks, including, but not limited to, a cellular network, a wide area network (WAN) (e.g., the Internet) or a local area network (LAN). For example, the server 802 can communicate with the oven 102 (and vice versa) using virtually any desired wired or wireless technology including for example, but not limited to: cellular, WAN, wireless fidelity (Wi-Fi), Wi-Max, WLAN, Bluetooth technology, a combination thereof, and/or the like. Further, although in the embodiment shown the management component 806 can be provided on the one or more servers 802, it should be appreciated that the architecture of system 800 is not so limited. For example, the management component 806, or one or more components of management component 806, can be located at another computer device, such as another server device, a client device, etc. In one or more embodiments, the management component 806, or one or more components of management component 806, can be located at the one or more ovens 102.

The reception component 808 can be operably coupled to the oven 102, the first junction 706, and/or the second junction 708 either directly or via the one or more networks 804. Additionally, the reception component 808 can be operably coupled to the various components described herein either directly, via the system bus 822, and/or via the one or more networks 804.

The solar component 810 can communicate with the one or more ovens 102 directly or via the one or more networks 804. In various embodiment, the solar component 810 can instruct one or more of the solar panels 132 to activate, deactivate, and/or alter alignment (e.g., angle relative to the positioning platform 130). In one or more embodiments, the oven 102 can comprise a GPS device 826 that can determine the geographical location of the oven 102 and send said location to the solar component 810 and/or one or more celestial databases 828 (e.g., via the reception component 808 and/or the one or more networks 804). The solar component 810 can determine a position of the sun in the sky relative to the oven 102 based on the oven's 102 location, the time of day, and/or the date. The solar component 810, based on its determinations, can update the status of one or more of the solar panels 132 by instructing the one or more solar panels 132 to: activate (e.g., when the solar component 810 determines that the sun is in a position conducive to supplying the subject solar panel 132 sunlight); deactivate (e.g., when the solar component 810 determines that the sun is not in a position conducive to supplying the subject solar panel 132 sunlight); and/or change the tilt of the subject solar panel 132 so as to maximize the amount of surface area of the solar panel 132 that faces the sun.

The solar component 810 can reference one or more celestial databases 828 comprising data regarding the position of the sun. In various embodiments, the one or more celestial databases 828 can be stored in the memory 820. In one or more embodiments, the one or more celestial databases 828 can be stored on a cloud environment and accessed via the one or more networks 804. The one or more celestial databases 828 can comprise the location of one or more ovens 102 along with the sun's position relative to a subject location at a plurality of times and/or dates. In various embodiments, the solar component 810 can reference the one or more celestial databases 828 and update the status of the one or more solar panels 132 continuously throughout a given day. In one or more embodiments, the solar component 810 can reference the one or more celestial databases 828 and update the status of the one or more solar panels 132 periodically throughout a given day. For example, the solar component 810 can reference the one or more celestial databases 828 and update the status of the one or more solar panels 132: each minute, every 15 minutes, every 30 minutes, every 45 minutes, each hour, and/or the like.

In various embodiments, the positioning component 812 can be operably coupled to the oven 102 directly or via one or more networks 804. The positioning component 812 can instruct the one or more positioning platforms 130 to rotate so as to face the one or more solar panels 132 towards the sun. In various embodiments, the oven 102 (e.g., via the GPS device 826) can send the location of the oven 102 to the positioning component 812. The positioning component 812 can reference the celestial database 828 to determine a position of the sun relative to the subject oven 102. The positioning component 812 can also instruct the positioning platform 130 to rotate a determined amount of degrees such that the one or more solar panels 132 face the sun. In other words, as the sun moves across the sky, the positioning component 812 can instruct the positioning platform 130 to rotate in accordance with the sun's movement.

In one or more embodiments, the positioning component 812 can reference the one or more celestial databases 828 and update the status of the one or more positioning platforms (e.g., by instructing the one or more positioning platforms to rotate) continuously throughout a given day. In one or more embodiments, the positioning component 812 can reference the one or more celestial databases 828 and update the status of the one or more positioning platforms 130 periodically throughout a given day. For example, the positioning component 812 can reference the one or more celestial databases 828 and update the status of the one or more positioning platforms 130: each minute, every 15 minutes, every 30 minutes, every 45 minutes, each hour, and/or the like.

The cooling component 814 can facilitate one or more cooling processes conducted by the oven system 100. Information regarding each bake performed by an oven 102 in the oven system 100 can be stored in a baking database 830. The baking database 830 can be stored in the memory 820 and/or in a cloud environment accessible via the one or more networks 804. Information comprising the baking database 830 can include, but is not limited to: bake schedules (e.g., the start and end time for each bake of each oven comprising the oven system 100), the predicted amount of excess heat associated with each bake to be performed by the oven system 100, the total volume of coolant needed to dissipate said excess heat, and/or whether a subject bake is subsequently followed by a quenching process.

In various embodiments, the cooling component 814 can be operably coupled, directly and/or via one or more networks 804, to the oven 102, the baking database 830, the first junction 706, and/or the second junction 708. The cooling component 814 can reference the baking database 830 to determine when a subject oven 102 needs coolant to conduct a cooling process and how much coolant the subject oven 102 needs. In response to determining that a subject oven 102 requires coolant, the cooling component 814 can instruct the first junction 706 to open one or more pathways leading to the oven 102 in the one or more coolant distributors 110. The first junction 706 can comprise one or more first sensors 832 to detect the flow of coolant through each path connected to the first junction 706. The one or more first sensors 832 can send data regarding the detected coolant flow to the cooling component 814 (e.g., via the reception component 808 and/or the one or more networks 804). Based on the data provided by the one or more first sensors 832, the cooling component 814 can determine the length of time the subject one or more open pathways controlled by the first junction 706 should remain open in order to distribute the proper amount of coolant to the subject oven 102 in accordance with the baking database 830.

In one or more embodiments, the cooling component 814 can also instruct the second junction 708 to open and/or close one or more pathways in the one or more outlet pipes 112. For example, the cooling component 814 can instruct the first junction 706 to begin a cooling process for an oven 102 (e.g., via opening one or more pathways in one or more coolant distributors 110 connected to the subject oven 102) and instruct the second junction 708 to open one or more pathways in one or more outlet pipes 112 connected to the subject oven 102 so as to permit heated gas from the initiated cooling process flow to the one or more heat exchangers 106. The second junction 708 can comprise one or more second sensors to detect the flow of gas through the one or more outlet pipes 112. The one or more second sensors 834 can send data regarding the detected coolant flow to the cooling component 814 (e.g., via the reception component 808 and/or the one or more networks 804). Based on the data provided by the one or more second sensors 834, the cooling component 814 can determine the length of time the subject one or more open pathways controlled by the second junction 708 should remain open in order to alleviate pressure from the generating of heated gas within the subject oven 102.

In various embodiments, the cooling component 814 can further instruct the one or more top doors 602 to open and/or close. The cooling component 814 can reference the baking database 830 to determine whether to initiate a quenching process for a subject oven 102. In response to determining the need for a quenching process (e.g., in response to determining that a quenching process is scheduled) the cooling component 814 can instruct the first junction 706 to open one or more pathways for one or more coolant distributors 110 that are connected to the subject oven 102 for quenching purposes. Additionally, the cooling component 814 can instruct the one or more top doors 602 to open, thereby permitting heated gas generated in the oven's 102 hollow space during the quenching process to flow through the one or more second outlet turbines 606. Based on the data provided by the one or more second sensors 834, the cooling component 814 can determine the length of time the subject one or more top doors 602 should remain open.

In various embodiments, the power monitoring component 816 can monitor the power status of the one or more ovens 102. The one or more ovens 102 can further comprise one or more third sensors 836 that detect the presence of electricity supplied to a subject oven 102 from a primary power source (e.g., a power grid). In one or more embodiments, the third sensor 836 can alert the power monitoring component 816 in the event that the oven's 102 primary power is abruptly discontinued without a power-down procedure. For example, wherein a power grid supplying power to an oven 102 suddenly experiences a power interruption during a bake, the third sensor 836 can alert the power monitoring component 816 (e.g., via the reception component 808 and/or the one or more networks 804) that the oven 102 has lost power during the bake. In one or more embodiments, the third sensor 836 can also detect when power from the primary power source becomes available again with regard to the subject oven 102 and alert the power monitoring component 816 (e.g., the reception component 808 and/or the one or more networks 804).

In response to being alerted (e.g., via the one or more third sensors 836) that an oven 102 has lost power during a bake, the power monitoring component 816 can instruct the oven 102 to disconnect from the primary power source and connect to the one or more batteries 108. Thereby, the oven 102 can utilize electricity previously generated by the oven 102, or other ovens (e.g., the second oven 702 and/or the third oven 704), to power the bake while the primary power source is discontinued. In response to being alerted power from an oven's 102 primary power source is available, the power monitoring component 816 can instruct the subject oven 102 to disconnect from the one or more batteries 108 and connect to the primary power source.

In various embodiments, the power distribution component 818 can facilitate distribution of electricity stored in the one or more batteries 108 to one or more electrical devices and/or a primary power source (e.g., a power grid operated by a utility company). For example, in response to the amount of electricity exceeding a predefined threshold, the power distribution component 818 can generate an offer to one or more computer devices (e.g., via the one or more networks 804) operated by the primary power source (e.g., a utility provider) to sell electricity stored in the one or more batteries 108. The threshold can be based on the energy needs of the oven system 100 (e.g., the one or more ovens 102). For instance, the threshold can be equivalent to the average energy needs to operate all the ovens 102 in the oven system 100 for a period of time (e.g., a day, a week, two weeks, and/or the like). Also, the amount of electricity the power distribution component 818 offers to sell can be dependent on how much electricity is stored in the one or more batteries 108 in excess of the threshold. The offer can include, but is not limited to: the amount of electricity offered to be sold, the price per unit of electricity, a total price, and/or an expected delivery date for electricity.

In one or more embodiments, the power distribution component 818 can check the energy levels of the one or more batteries 108 in predetermined periods (e.g., each month) to determine whether enough electricity is stored to generate an offer. Proceeds of the sale can be distributed directly to an operator of the oven system 100, and/or the proceeds can be credited to an account that the operator of the oven system 100 has with the primary power source (e.g., an account with a utility provider). Distribution of the proceeds can be managed via a cloud environment controlled by the power distribution component 818 and/or a third a party (e.g., the primary power source provider). Electricity can be transferred from the one or more batteries 108 to the primary power source provider via one or more electrical cords 116 connected to the one or more batteries 108.

Figure 9:
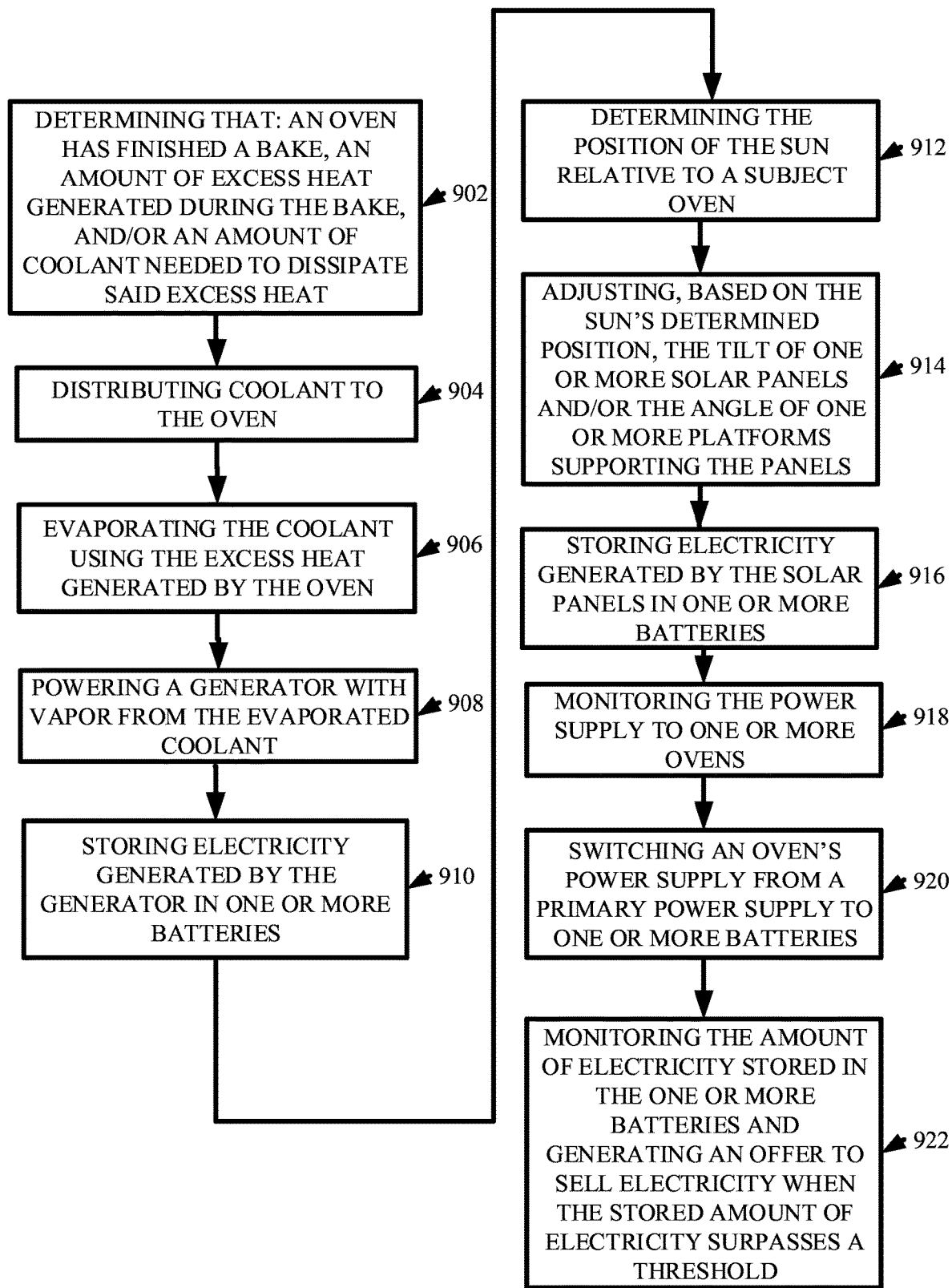
FIG. 9 illustrates a flow chart of an example, non-limiting method for converting excess heat energy in an oven into electricity in accordance with one or more embodiments described herein.

FIG. 9 illustrates a flow chart of an example, non-limiting method 900 to facilitate operating the oven system 100 and/or the system 800. Repetitive description of like elements employed in other embodiments described herein is omitted for sake of brevity. At 902 the method 900 can comprise determining (e.g., via the cooling component 814 and/or the baking database 830) that: an oven 102 has finished a bake, an amount of excess heat generated during the bake, and/or an amount of coolant needed to dissipate said excess heat. At 904 the method 900 can comprise distributing coolant to the oven 102 (e.g., via the cooling component 814, the one or more coolant distributors 110, and/or the first junction 706). At 906 the method 900 can comprise evaporating the coolant using the excess heat generated by the oven 102 (e.g., via the inlet manifold 220, the one or more coolant pipes 218, and/or the top door 602). At 908 the method 900 can comprise powering a generator (e.g., the one or more second electric generators 304 and/or the one or more first electric generators 204) with heated vapor from the evaporated coolant (e.g., via the outlet manifold 216, the chamber 214, and/or one or more first outlet turbines 502). At 910 the method 900 can comprise storing electricity generated by the generator in one or more batteries (e.g., via the one or more electrical cords 116 and/or the one or more batteries 108).

In various embodiments, the method 900 can further comprise, for example at 912, determining the position of the sun in relation to a subject oven 102 (e.g., via the solar component 810, the positioning component 812, and/or the celestial database 828). At 914, the method 900 can also comprise adjusting, based on the sun's determined position, the tilt of one or more of the solar panels (e.g., solar panel 132) and/or the angle of one or more platforms (e.g., the one or more positioning platforms 130) supporting the one or more solar panels (e.g., via the solar component 810 and/or the positioning component 812). At 916 the method 900 can comprise storing electricity generated by the solar panels in one or more batteries (e.g., via the one or more electrical cords 116 and/or the one or more batteries 108).

In one or more embodiments, at 918 the method 900 can comprise monitoring the power supply to one or more ovens 102 (e.g. via the power monitoring component 816). At 920, the method 900 can comprise switching an oven's 102 power supply from a primary power source (e.g., a utility provider) to the one or more batteries (e.g., the one or more batteries 108) storing electricity generated from the generators and/or the solar panels (e.g., via the power monitoring component 816). At 922, the method 900 can further comprise monitoring the amount of electricity stored in the one or more batteries (e.g., the one or more batteries 108), and generating an offer to sell electricity when the stored amount of electricity surpasses a threshold (e.g., via the power distribution component 818).

Figure 10:
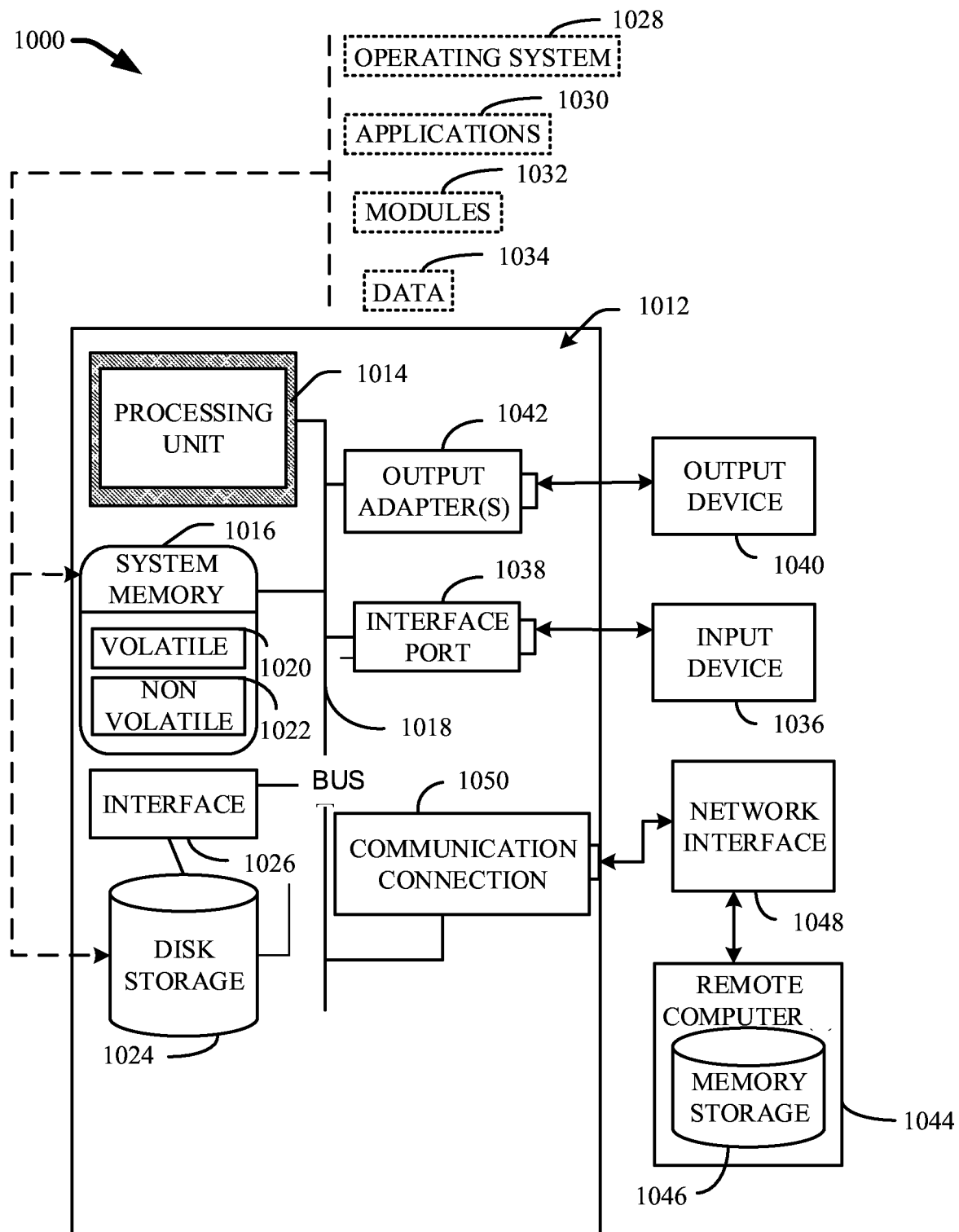
FIG. 10 illustrates a block diagram of an example, non-limiting operating environment in which one or more embodiments described herein can be facilitated.

In order to provide a context for the various aspects of the disclosed subject matter, FIG. 10 as well as the following discussion are intended to provide a general description of a suitable environment in which the various aspects of the disclosed subject matter can be implemented. FIG. 10 illustrates a block diagram of an example, non-limiting operating environment in which one or more embodiments described herein can be facilitated. Repetitive description of like elements employed in other embodiments described herein is omitted for sake of brevity. With reference to FIG. 10, a suitable operating environment 1000 for implementing various aspects of this disclosure can include a computer 1012. The computer 1012 can also include a processing unit 1014, a system memory 1016, and a system bus 1018. The system bus 1018 can operably couple system components including, but not limited to, the system memory 1016 to the processing unit 1014. The processing unit 1014 can be any of various available processors. Dual microprocessors and other multiprocessor architectures also can be employed as the processing unit 1014. The system bus 1018 can be any of several types of bus structures including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire, and Small Computer Systems Interface (SCSI). The system memory 1016 can also include volatile memory 1020 and nonvolatile memory 1022. The basic input/output system (BIOS), containing the basic routines to transfer information between elements within the computer 1012, such as during start-up, can be stored in nonvolatile memory 1022. By way of illustration, and not limitation, nonvolatile memory 1022 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM). Volatile memory 1020 can also include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 1012 can also include removable/non-removable, volatile/non-volatile computer storage media. FIG. 10 illustrates, for example, a disk storage 1024. Disk storage 1024 can also include, but is not limited to, devices like a magnetic disk drive, floppy disk drive, tape drive, Jaz drive, Zip drive, LS-100 drive, flash memory card, or memory stick. The disk storage 1024 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1024 to the system bus 1018, a removable or non-removable interface can be used, such as interface 1026. FIG. 10 also depicts software that can act as an intermediary between users and the basic computer resources described in the suitable operating environment 1000. Such software can also include, for example, an operating system 1028. Operating system 1028, which can be stored on disk storage 1024, acts to control and allocate resources of the computer 1012. System applications 1030 can take advantage of the management of resources by operating system 1028 through program modules 1032 and program data 1034, e.g., stored either in system memory 1016 or on disk storage 1024. It is to be appreciated that this disclosure can be implemented with various operating systems or combinations of operating systems. A user enters commands or information into the computer 1012 through one or more input devices 1036. Input devices 1036 can include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices can connect to the processing unit 1014 through the system bus 1018 via one or more interface ports 1038. The one or more Interface ports 1038 can include, for example, a serial port, a parallel port, a game port, and a universal serial bus (USB). One or more output devices 1040 can use some of the same type of ports as input device 1036. Thus, for example, a USB port can be used to provide input to computer 1012, and to output information from computer 1012 to an output device 1040. Output adapter 1042 can be provided to illustrate that there are some output devices 1040 like monitors, speakers, and printers, among other output devices 1040, which require special adapters. The output adapters 1042 can include, by way of illustration and not limitation, video and sound cards that provide a means of connection between the output device 1040 and the system bus 1018. It should be noted that other devices and/or systems of devices provide both input and output capabilities such as one or more remote computers 1044.

Computer 1012 can operate in a networked environment using logical connections to one or more remote computers, such as remote computer 1044. The remote computer 1044 can be a computer, a server, a router, a network PC, a workstation, a microprocessor based appliance, a peer device or other common network node and the like, and typically can also include many or all of the elements described relative to computer 1012. For purposes of brevity, only a memory storage device 1046 is illustrated with remote computer 1044. Remote computer 1044 can be logically connected to computer 1012 through a network interface 1048 and then physically connected via communication connection 1050. Further, operation can be distributed across multiple (local and remote) systems. Network interface 1048 can encompass wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). One or more communication connections 1050 refers to the hardware/software employed to connect the network interface 1048 to the system bus 1018. While communication connection 1050 is shown for illustrative clarity inside computer 1012, it can also be external to computer 1012. The hardware/software for connection to the network interface 1048 can also include, for exemplary purposes only, internal and external technologies such as, modems including regular telephone grade modems, cable modems and DSL modems, ISDN adapters, and Ethernet cards.

Embodiments of the present invention can be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of various aspects of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to customize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which includes one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments where tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device including, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components including a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or non-volatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems, computer program products and computer-implemented methods. It is, of course, not possible to describe every conceivable combination of components, products and/or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
   determining, by a system coupled to a processor, a predicted amount of excess heat associated with a bake of an oven;
   distributing an amount of coolant from a coolant reservoir to a coolant pathway that is necessary to dissipate the predicted amount of excess heat, wherein the coolant pathway is located within the oven and adjacent to generated excess heat, and wherein at least a portion of the coolant pathway extends from a bottom portion of the oven to a top portion of the oven;
   evaporating the coolant using the generated excess heat to generate a gas;
   powering a generator by a flow of the gas to generate electricity; and
   storing the generated electricity in a battery.

2. The method of claim 1, further comprising determining, by the system, an angle of sunlight relative to the oven.

3. The method of claim 2, further comprising adjusting a tilt of a solar panel and rotating a platform supporting the solar panel based on the angle of sunlight.

4. The method of claim 3, further comprising updating a status of the solar panel based on information from one or more celestial databases.

5. The method of claim 3, further comprising storing electricity generated by the solar panel in the battery.

6. The method of claim 1, further comprising detecting, by the system, an interruption in a supply of electricity from a primary power source to the oven.

7. The method of claim 6, further comprising supplying electricity to the oven from the battery.

8. The method of claim 7, further comprising determining whether the primary power source becomes available again, and, in response to determining that the primary power source is available, causing the oven to disconnect from the battery and connect to the primary power source.

9. The method of claim 1, further comprising detecting, by the system, an amount of electricity stored in the battery.

10. The method of claim 9, further comprising generating an offer to sell the electricity stored in the battery in response to detecting that the amount of electricity stored in the battery is greater than a threshold.

11. The method of claim 10, wherein the offer is sent to a third party via a cloud network.

12. The method of claim 1, further comprising distributing electricity stored in the battery to one or more electrical devices.

13. The method of claim 1, further comprising:
   detecting, by a sensor, a rate of flow through the coolant pathway.

14. A method, comprising:
   determining, by a system coupled to a processor, a predicted amount of excess heat associated with an oven of a plurality of ovens during a bake;
   determining a length of time that an inlet junction must be open to a first coolant pathway associated with the oven to allow for flow of an amount of coolant to the first coolant pathway, wherein the amount of coolant is based on the predicted amount of excess heat, and wherein at least a portion of the first coolant pathway extends from a bottom portion of the oven to a top portion of the oven;
   opening the junction to the first coolant pathway for the length of time;
   evaporating the coolant using generated excess heat to generate a gas;

powering a generator by a flow of the gas to generate electricity; and storing the generated electricity in a battery.

15. The method of claim 14, wherein the inlet junction connects a plurality of coolant pathways associated with the plurality of ovens and an outlet junction connects a plurality of outlet pathways associated with the plurality of ovens.

16. The method of claim 15, further comprising opening one or more of the outlet pathways of the outlet junction associated with the oven.

17. The method of claim 15, wherein coolant pathways of the plurality of coolant pathways are configured to be independently openable and closable.

18. The method of claim 16, wherein the outlet pathways of the plurality of outlet pathways are configured to be independently openable and closable.

19. The method of claim 14, further comprising detecting, by the system, an interruption in a supply of electricity from a primary power source to the plurality of ovens.

20. The method of claim 14, further comprising supplying electricity to the plurality of ovens from the battery.

\* \* \* \* \*